(12) United States Patent
Anglin et al.

(10) Patent No.: US 8,838,529 B2
(45) Date of Patent: Sep. 16, 2014

(54) APPLYING REPLICATION RULES TO DETERMINE WHETHER TO REPLICATE OBJECTS

(75) Inventors: Matthew J. Anglin, Tucson, AZ (US); David M. Cannon, Tucson, AZ (US); Colin S. Dawson, Tucson, AZ (US); Howard N. Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/221,691

(22) Filed: Aug. 30, 2011

(65) Prior Publication Data
US 2013/0054518 A1 Feb. 28, 2013

(51) Int. Cl.
*G06F 17/00* (2006.01)
*G06F 17/30* (2006.01)
(52) U.S. Cl.
CPC ............................... *G06F 17/30575* (2013.01)
USPC ............ 707/609; 707/610; 707/634; 709/217
(58) Field of Classification Search
USPC .................................... 707/608–686; 709/217
See application file for complete search history.

(56) References Cited

U.S. PATENT DOCUMENTS

| 6,978,282 | B1 | 12/2005 | Dings et al. |
| 7,720,796 | B2* | 5/2010 | Wong et al. ................... 707/639 |
| 2003/0204557 | A1 | 10/2003 | Mandal et al. |
| 2004/0153473 | A1 | 8/2004 | Hutchinson et al. |
| 2005/0027748 | A1 | 2/2005 | Kisley |
| 2005/0125430 | A1* | 6/2005 | Souder et al. ................. 707/100 |
| 2006/0161449 | A1 | 7/2006 | McKinney |
| 2007/0055835 | A1 | 3/2007 | Malkin et al. |
| 2008/0250086 | A1 | 10/2008 | Kisley |
| 2009/0119346 | A1 | 5/2009 | Lu et al. |
| 2010/0063951 | A1 | 3/2010 | Nagoya et al. |
| 2011/0196835 | A1* | 8/2011 | Kesselman .................... 707/634 |

OTHER PUBLICATIONS

P. Mell, "THe NIST Definition of Cloud Computing (Draft)", National Institute of Standards and Technology, Special Publication 800-145 (draft), Jan. 2011, pp. 1-7.
U.S. Patent Application entitled, "Replication of Data Objects From a Source Server to a Target Server", Serial No. not yet assigned, filed Aug. 30, 2011, by inventors M. Aglin, D. Cannon, C. Dawson, B. Fruchtman, M. Haye, and H. Martin.

* cited by examiner

*Primary Examiner* — Tony Mahmoudi
*Assistant Examiner* — Tuan-Khanh Phan
(74) *Attorney, Agent, or Firm* — David W. Victor; Konrad, Raynes, Davda and Victor LLP

(57) ABSTRACT

A source server maintains a replication rule specifying a condition for a replication attribute and a replication action to take if the condition with respect to the replication attribute is satisfied, wherein the replication action indicates to include or exclude the object having an attribute value for the replication attribute that satisfies the condition. For each of the objects, the replication rule is applied by determining an attribute value of the object corresponding to the replication attribute in the replication rule and determining whether the determined attribute value satisfies the condition for the replication attribute defined in the determined replication rule. The replication action on the object in response to determining that the determined attribute value satisfies the condition for the replication attribute.

25 Claims, 8 Drawing Sheets

Global Replication Rule

Object Information

Replication Rule

Global Replication Rule

Source/Target Replication Database Entry

US 8,838,529 B2

APPLYING REPLICATION RULES TO DETERMINE WHETHER TO REPLICATE OBJECTS

BACKGROUND OF THE INVENTION

1. Field of the Invention

The present invention relates to a computer program product, system, and method for applying replication rules to determine whether to replicate objects.

2. Description of the Related Art

Data replication is used to replicate data belonging to multiple nodes from one server to another server, so that if the main source server to which data is being backed-up goes down, the clients can recover their data from the replication site. A storage-management server such as Tivoli® Storage Manager (TSM) stores data objects in one or more storage pools and uses a database for tracking metadata about the stored objects. (Tivoli is a trademark of International Business Machines Corporation worldwide). The storage management server may replicate the data objects to a remote location for disaster recovery purposes. Some of the methods used to transfer data to a remote location include physically transporting tapes containing copies of the data from the source site to the disaster recovery site, electronically transmitting the data (TSM export/import) or using hardware replication of the source site disk storage to create a mirror of the data. Available replication hardware devices include Virtual Tape Library (VTL) products that perform block-level replication using deduplication hardware.

There is a need in the art for improved techniques for replicating objects from one server to another.

SUMMARY

Providing a computer program product, system, and method for applying replication rules to determine whether to replicate objects from a source storage managed by a source server to a target storage managed by a target server. The source server maintains a replication rule specifying a condition for a replication attribute and a replication action to take if the condition with respect to the replication attribute is satisfied, wherein the replication action indicates to include or exclude the object having an attribute value for the replication attribute that satisfies the condition. An operation is initiated to replicate objects at the source server to the target server. For each of the objects, the replication rule is applied by determining an attribute value of the object corresponding to the replication attribute in the replication rule and determining whether the determined attribute value satisfies the condition for the replication attribute defined in the determined replication rule. The replication action is performed on the object in response to determining that the determined attribute value satisfies the condition for the replication attribute.

DETAILED DESCRIPTION

Described embodiments replicate data objects from a source server to a target server by allowing the user to define replication rules to determine objects to replicate based on attributes of the objects, such as the client node to which the object is assigned, a filespace of the object in the client node, and a data type of the object. With the described embodiments, a user may define a hierarchy of replication rules that are applied to objects to determine whether to replicate the objects based on an attribute of the replication rule and the corresponding value for that attribute in the object. Further, priorities may be provided in the replication rule to associate a priority with objects that satisfy the replication rule to control the priority in which objects are copied to the target server as part of replications. Further, with described embodiments, replication rules may be organized according to a hierarchy defined to have different levels of replication rules, where replication rules at a lower, more specific, level have precedence over rules at a higher, more general, level. Further, higher level rules may only be considered if the attributes of the object did not satisfy a condition with respect to a lower level replication rule.

Figure 1:
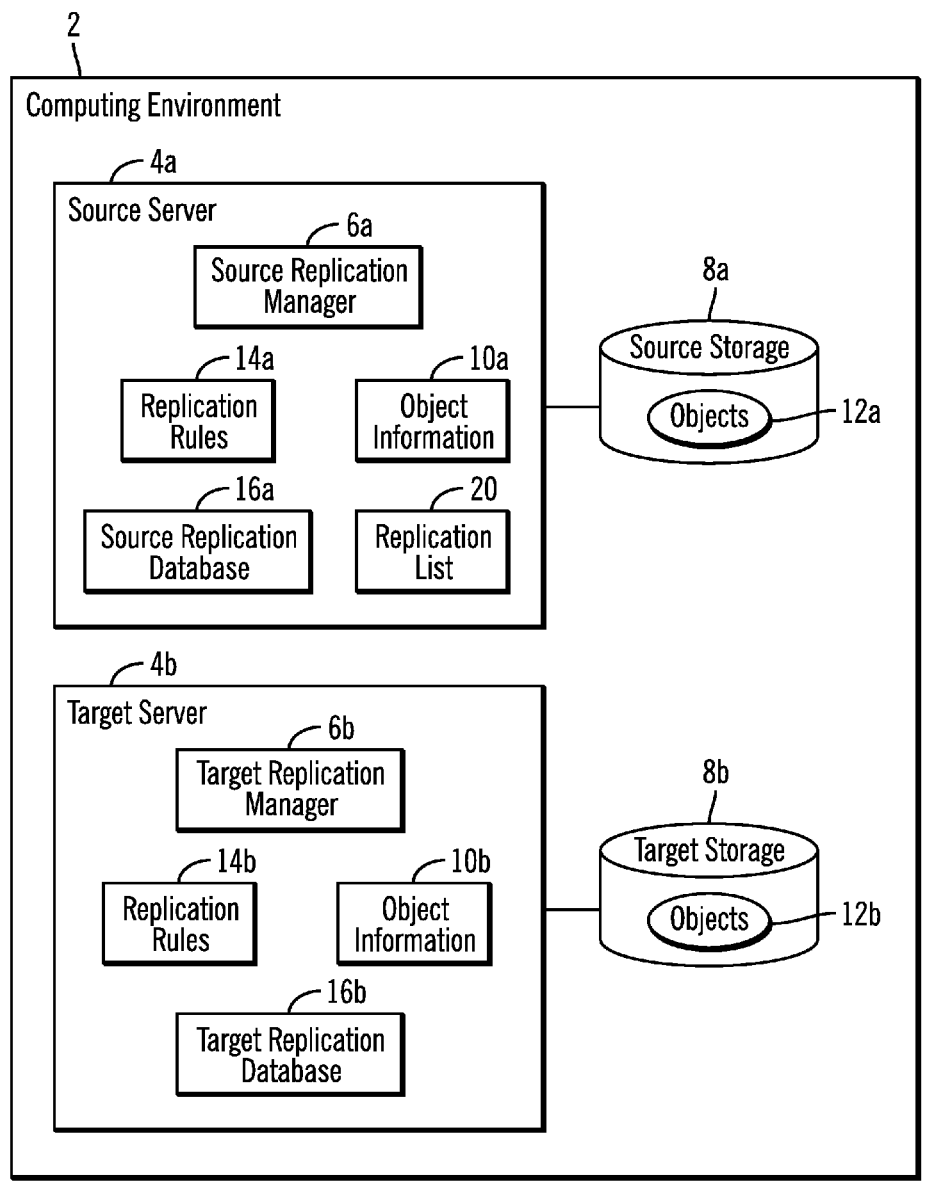
FIG. 1 illustrates a computing environment in which embodiments are implemented.

FIG. 1 illustrates an embodiment of a computing environment 2 having a source server 4a and target server 4b including a source replication manager 6a and target replication manager 6b, respectively, to replicate the data for objects 12a at a source storage 8a to objects 12b at a target storage 8b. Either server 4a, 4b device may function as the source and target server. The replication may be performed on behalf of client nodes connected to the source server 4a to replicate objects owned by the client node and provided by the client node to store in the source storage 8a. The source server 4a and target server 4b maintain data objects as defined in the object information 10a and 10b, respectively. The object information 10a, 10b includes metadata or entries for the objects 12a, 12b, where the objects 12a, 12b are comprised of an ordered list of chunks of data assigned to the object.

The source server 4a and target server 4b maintain a source replication database 16a and target replication database 16b, respectively, having information on data objects at the source server 4a replicated to the target server 4b on behalf of a client node. The source 4a and target server 4b further maintain replication rules 14a, 14b, respectively, that are applied to the metadata of objects to determine which of the objects should be replicated from the source storage 8a to the target storage 8b. If the replication rules 14a indicate that an object is to be replicated, then an identifier of the object 12a is added to the replication list 20 of objects 12a to replicate. In certain embodiments, when replicating data objects 12a to the target server 4b, the source server 4a may use deduplication to avoid sending chunks of replicated data objects 12a that are already maintained in the target storage 8b. The replication list 20 may be maintained in memory of the source server 4a and/or as information in the source replication database 16a.

The source 4a and target 4b servers may be implemented in separate computer devices that communicate over a network, such as a local area network (LAN), storage area network (SAN), wide area network (WAN), etc. In further embodiments, the source 4a and server 4b servers may be implemented on one or two computer systems. If the source 4a and target 4b server are in the same system, then they may communicate over a bus or via memory.

The source 8a and target 8b storages may be configured in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The source replication manager 6a and target replication manager 6b may comprise software programs in a memory executed by a processor. In an alternative embodiment, some portion or all of the programs 6a and 6b may be implemented in a hardware component, such as a dedicated integrated circuit, e.g., Application Specific Integrated Circuit (ASIC), expansion card, etc.

Although the source replication manager 6a and target replication manager 6b are shown as separate components, in alternative implementations the functions performed by the these components 6a, 6b may be implemented in a single program component in a single computer system or in more than two program components in more than two computer devices.

The source 6a and target 6b replication managers may be used by client nodes to recover objects as part of a restore operation for a client node.

Figure 2:
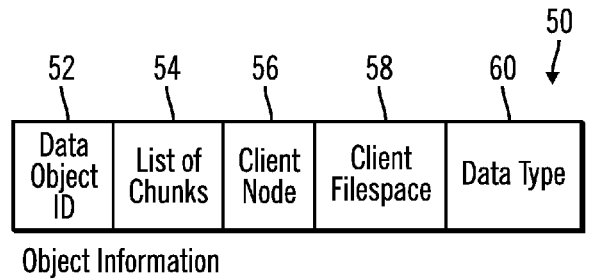
FIG. 2 illustrates an embodiment of object information.

FIG. 2 illustrates an embodiment of object information 50 for one of the objects 12a, 12b maintained in the object information 10a, 10b, respectively. The object information 50 for one object includes an identifier (ID) 52 of the object, a list 54 identifying one or more chunks or data assigned to the object 52, such as a digest and length of the chunk to reference the chunks in the object 50; a client node 56 to which the object is assigned, i.e., that owns the object, a client filespace 58, e.g., logical drive, partition, etc., in which the object 52 is stored at the client node 56; a data type 60 of the object 52, such as archive data, back-up data, space-managed data, etc. The servers 4a, 4b maintain information on the location of the chunks in the object 50 in the storage 8a, 8b.

Figure 3:
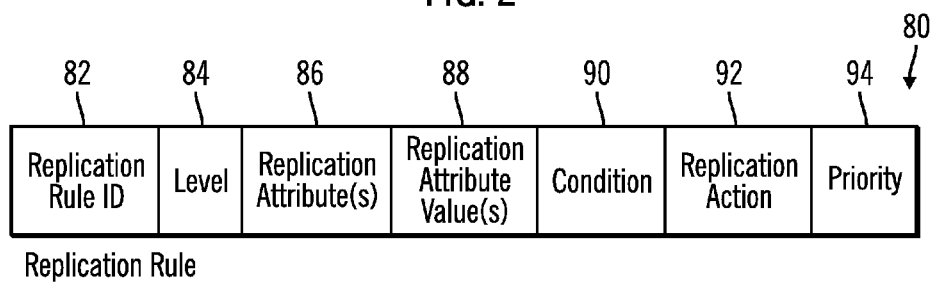
FIG. 3 illustrates an embodiment of a replication rule.

FIG. 3 illustrates an embodiment of a replication rule 80, which includes a replication rule identifier (ID) 82, a level 84 of the replication rule to provide a hierarchical arrangement of replication rules, such that rules at a lower, more specific, level are applied before those at a higher, more general, level; one or more replication attributes 86 comprising attributes of an object to which the rule applies, such as client node, client filespace, data type, etc; one or more replication attribute values 88 specifying a value of the replication attribute; a condition 90 with respect to the replication attribute value(s) 88 in the rule and the corresponding attribute value(s) 56, 58, 60 (FIG. 2) indicated in the object information 50 (FIG. 2) for the object 12a, such as a comparison result, matching, a function, etc.; a replication action 92 providing an action to perform if the condition 90 with respect to the replication attribute value(s) 88 are satisfied by the attribute value(s) 56, 58, 60 for the object to which the rule is applied; and a priority 94 at which to copy the object satisfying the rule 80 to the target server 4b if the replication action 92 indicates to replicate the object satisfying the rule 80 condition 90. The priority may comprise one of multiple priority levels.

Figure 4:
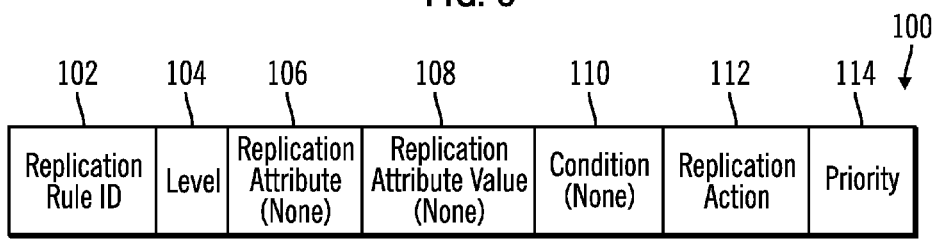
FIG. 4 illustrates an embodiment of a global replication rule.

FIG. 4 illustrates an embodiment of a global replication rule 100 indicating a replication default rule, such as to exclude or include objects, including new and existing objects, that do not satisfy the conditions of any of the other attribute specific replication rules. The global replication rule 100 may include all the fields of the replication rule 80 of FIG. 3. In certain embodiments, the global replication rule 100 may not provide values for the replication attribute 106, replication attribute value 108, and condition 110 to indicate that there is no condition comparison to be performed, and that any objects to which the rule applies are subject to the specified replication action 112, include or exclude from replication, at the specified priority 94 if the replication action is to include the object in replication.

Figure 5:
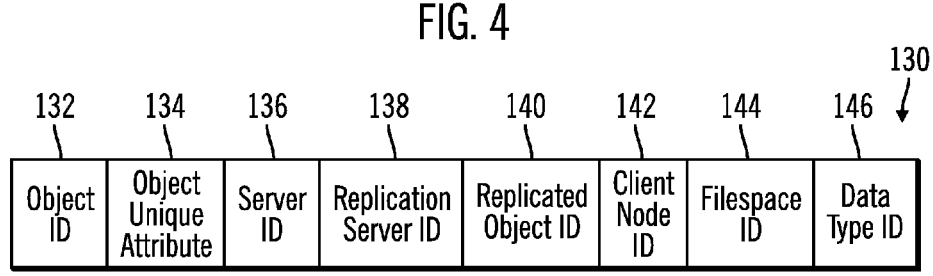
FIG. 5 illustrates an embodiment of a source and target replication database entry.

FIG. 5 illustrates an embodiment of an entry 130 in the source 16a and target 16b replication databases for each object being replicated from the source server 4a to the target server 4b. The entry 130 includes an object identifier (ID) 132; an object unique attribute 134 providing a unique identifier of the object, such as a signature, hash value or unique naming convention; a server identifier (ID) 136 comprising an identifier of the server 4a, 4b maintaining the object 132; a replication server ID 138 identifying the other server 4a, 4b in the replication relationship (for instance, an entry 130 in the source replication database 16a has the identifier of the target server 4b for field 138 and an entry 130 in the target replication database 16b has the identifier of the source server 4a for field 138); a replicated object ID 140 identifying the identifier assigned to the object in the replication server 138; a node identifier 142 of the client node owning the object 132; a filespace ID 144 identifying the filespace including the object 132; and a data type ID 146 identifying a data type of the object 132.

Figure 6:
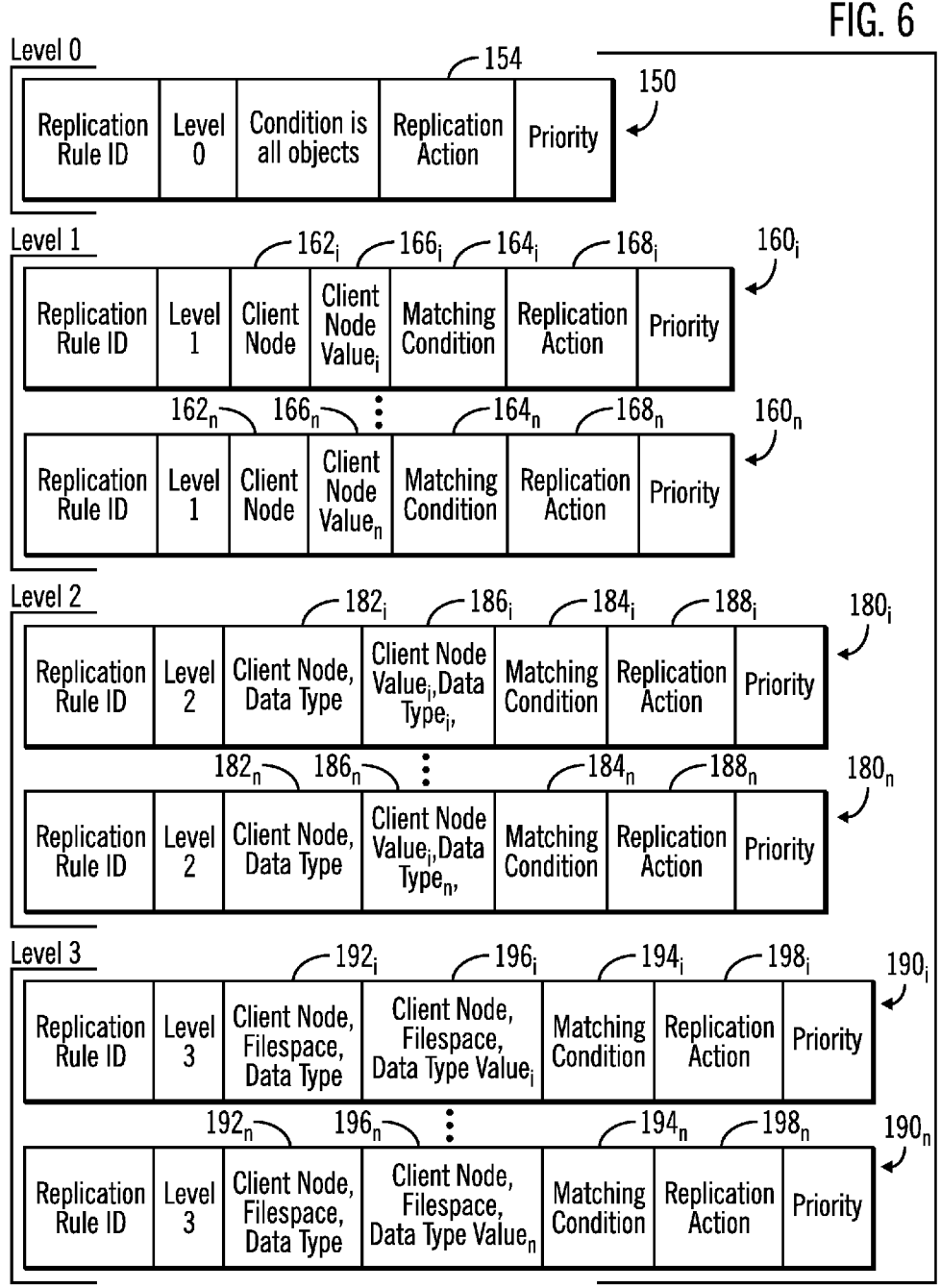
FIG. 6 illustrates an embodiment of different level replication rules.

FIG. 6 illustrates an embodiment of a hierarchy of replication rules 14a, 14b, which include the fields as described with respect to FIG. 3. As discussed, the lower level rules have precedence, are applied first, and if no replication rule at one level applies, then a next higher level, with more general replication rules, is considered. A level 0 replication rule 150 comprises a highest level global replication rule that specifies a replication action 154 to apply, such as include or exclude from replication, if the attributes of the object being considered do not satisfy the conditions of any lower level replication rule in the hierarchy. Level 1 replication rules 160i . . . 160n specify lower level rules, with respect to level 0, that consider the client node 162i . . . 162n of the object and apply if the client node 56 (FIG. 2) for the object 12a being considered matches, as indicated in the condition field 164i . . . 164n, the specified client node value 166i . . . 166n of the rule. The replication action 168i . . . 168n specifies the action, such as inclusion or exclusion from replication, if the client node 56 in the object information 50 (FIG. 2) of the object 12a matches the specified client node value 166i . . . 166n of one of the rules 160i . . . 160n. In certain embodiments, there may be one level 1 replication rule 160i . . . 160n for some or all client nodes supplying objects 12a to the source server 4a to replicate to the target server 4b.

Level 2 replication rules 180i . . . 180n, at a further lower level than Level 1 rules, specify rules that consider both the client node and the data type 182i . . . 182n of the object and apply if the client node 56 and data type 60 in the object information 50 (FIG. 2) for the object 12a being considered match, as indicated in the condition field 184i . . . 184n, the specified client node and data type values 186i . . . 186n of the rule. The replication action 188i . . . 188n specifies the action, such as inclusion or exclusion from replication, if the client node 56 and data type 60 values in the object information 50 of the object 12a match the specified client node and data type values 186i . . . 186n of one of the rules 180i . . . 180n. In certain embodiments, there may be one level 2 replication rule 180i . . . 180n for some or all client nodes supplying objects and some or all of the possible data types for objects 12a.

Level 3 replication rules 190i . . . 190n specify rules that consider the client node, filespace, and data type 192i . . . 192n of the object and apply if the client node 56, client filespace 58, and data type 60 in the object information 50 (FIG. 2) for the object 12a being considered matches, as indicated in the condition field 194i . . . 194n, the specified client node, filespace, and data type values 196i . . . 196n of the rule. The replication action 198i . . . 198n specifies the action, such as inclusion or exclusion from replication, if the client node 56, client filespace 58, and data type 60 values (FIG. 2) of the object 12a, as indicated in the object information 50, matches the specified client node, filespace, and data type values 196i . . . 196n of one of the rules 190i . . . 190n. In certain embodiments, there may be one or more level 3 replication rule 190i . . . 190n for the possible client node, filespace and data type combinations of values for objects 12a, In the embodiment of FIG. 6, the level 3 replication rules 190i . . . 190n are applied to the objects, and if the client node 56, filespace 58 and data type 60 of an object do not satisfy one of the level 3 replication rules 190i . . . 190n, then the higher level 2 replication rules 180i . . . 180n are applied. If the object does not have a client node 56 and data type 60 satisfying one of the level 2 replication rules 180i . . . 180n, then the even higher level 1 replication rules 160i . . . 160n are applied. Likewise, if no level 1 replication rule 160i . . . 160n is satisfied, then the highest, most general, level 0 global replication rule 150 is applied. In the description with respect to FIG. 6, references to high, higher, highest, low, lower, lowest refer to the position in the hierarchy and not to the level number, where a higher level number refers to a lower level rule in the hierarchy.

In certain embodiments, the replication rules may be created by an administrator. If the administrator does not create a replication rule applicable to the specific attributes of an object being considered, then the global replication rule 150 may apply, if one is provided. If no global replication rule and replication rule applicable to the attributes of the object are provided, then the object may not be included in the replication list 20.

Prioritization within a class of data, set of nodes, etc., facilitates the management of the bandwidth between the source 4a and target 4b replication sites. An example of prioritization is that there can be NORMAL and HIGH priority rules. For example all clients can be assigned to a NORMAL priority replication rule for any BACKUP data that they store in the source storage 8a. In addition, specific client nodes can be assigned to a HIGH priority rule, or specific data for various client nodes could be assigned to a HIGH priority rule. This prioritization allows a scheduled replication action to replicate the HIGH priority data ahead of the NORMAL priority data. While possibly done in order to move important data with preference over limited bandwidth between the source 4a and target 4b servers, prioritization may also be used to satisfy service level agreement (SLA) requirements that indicate certain data has to be replicated before other data.

SLAs may specify whether there is to be replication and a priority for replication for a specific client node and may further specify particular data types to replicate and not depending an SLA level, e.g., gold, silver, bronze, etc. Further, the priorities specified for different replication rules, indicating a priority in which the object will be replicated, may further be specified by the SLA for a particular user of the client node.

The variables i, j and n indicating a number of an element, such as a level 1, 2, or 3, replication rule may comprise any integer value and when used to denote a specific number of instances of an element, e.g., 160n, 162n 164n, 166n, 168n, 180n, 182n, 184n, 186n, 188n, 190n, 192n, 194n, 196n, 198n. Further, the same variable when used with different elements may indicate a same or different number of elements.

Figure 7:
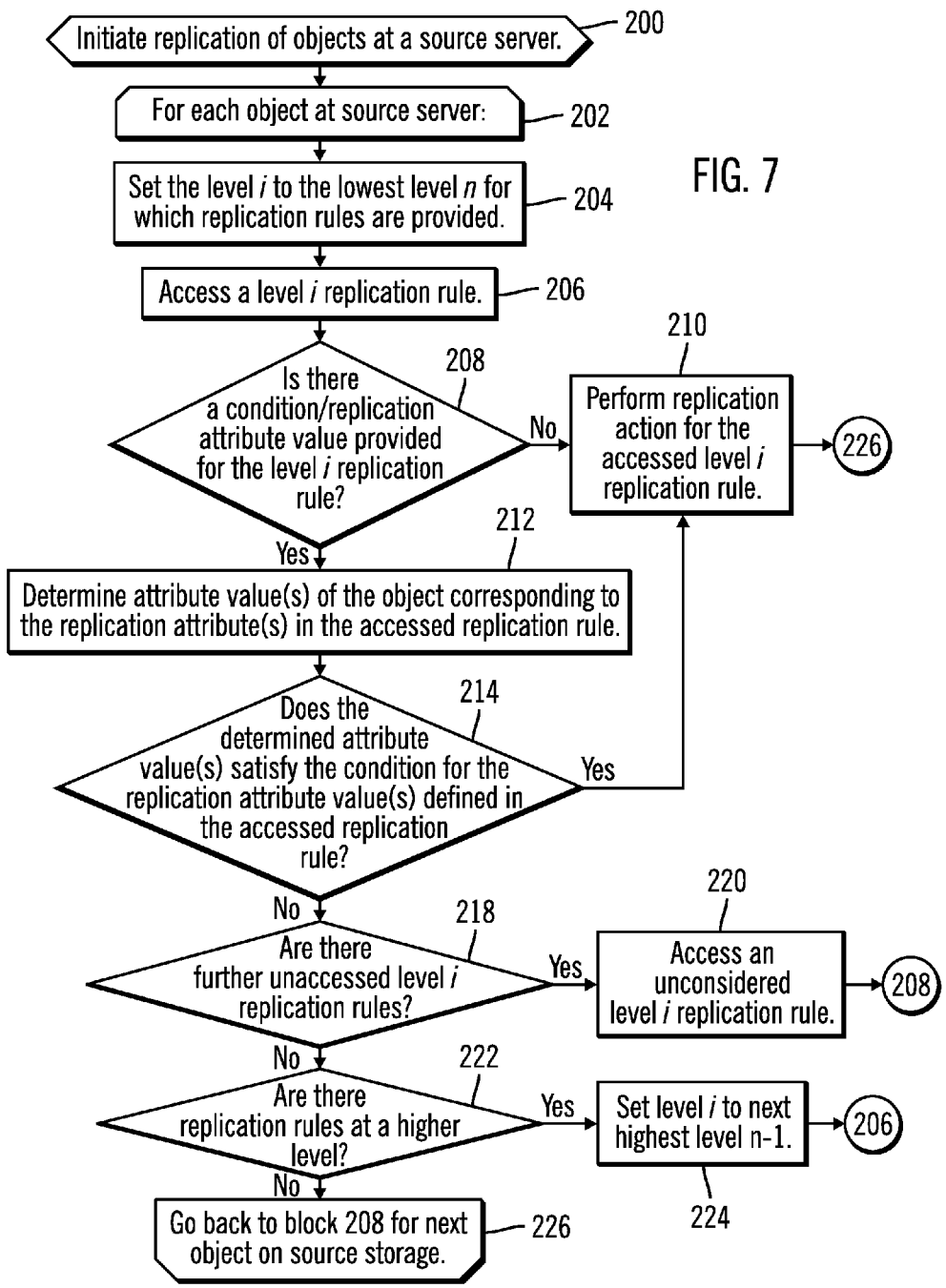
FIG. 7 illustrates an embodiment of operations to apply replication rules to determine objects to replicate.

FIG. 7 illustrates an embodiment of operations performed by the source replication manager 6a to determine which objects to replicate and indicate in the replication list 20. Upon initiating (at block 200) the operation to replicate objects 12a in the source storage 8a, the source replication manager 6a performs (at block 202-226) the operations at blocks 204 through 224 for each object 12a at the source server 4a. The loop at blocks 202 through 226 may end after processing all objects the source storage 8a, or may end upon occurrence of some other condition. For a selected object 12a, the source replication manager 6a sets (at block 204) the level i to consider to a lowest level n for which replication rules 14a are provided, e.g., level 3 in the example of FIG. 3. The source replication manager 6a then accesses (at block 206) a level i replication rule to consider. If (at block 208) there is no condition/replication attribute value provided for the level i replication rule, then the level i rule is a global replication rule 150 (FIG. 6), 100 (FIG. 4), and the source replication manager 6a performs (at block 210) the replication action 154 (FIG. 6) specified for the global replication rule. If the replication action is to include the object in the replication, then an identifier of the object is added to the replication list 20.

If (at block 208) there is a condition and attribute value provided for the replication rule, then the source replication manager 6a determines (at block 212) attributes value(s) 56, 58, 60 (FIG. 2) of the object corresponding to the replication attribute(s) 88 in the accessed level i replication rule. If (at block 214) the one or more determined attribute value(s) of the object satisfy the condition with respect to the one or more replication attribute value(s) 88 defined in the accessed replication rule, such as match the replication attribute value(s) defined for the rule, then the specified replication action 92 is performed (at block 210) for that object and control proceeds (at block 226) to consider the next object in the source storage 8a. If (at block 214) the determined attribute value(s) 56, 58, 60 (FIG. 2) of the object 12a do not satisfy the condition 90 with respect to the replication attribute value(s) 88 and if (at block 218) there are further unaccessed level i replication rules to consider, e.g., $160_j$, $180_j$, $190_j$, where j is an integer value greater than 1, then the source replication manager 6a accesses (at block 220) an unconsidered level i replication rule and proceeds to block 208 to apply that accessed level i rule. If (at block 218) there are no further unaccessed level i replication rules and if (at block 222) there are replication rules at a higher level than level i, then the source replication manager 6a sets (at block 224) the level i to the next highest unconsidered level, which may be i−1, and proceeds to block 206 to access a replication rule for the next considered higher level. If there are no replication rules to consider (from the no branch of block 222) or if an object satisfied one replication rule (from block 210), then control proceeds (at block 226) to block 204 to apply the replication rules to the next object to consider for replication.

Figure 8:
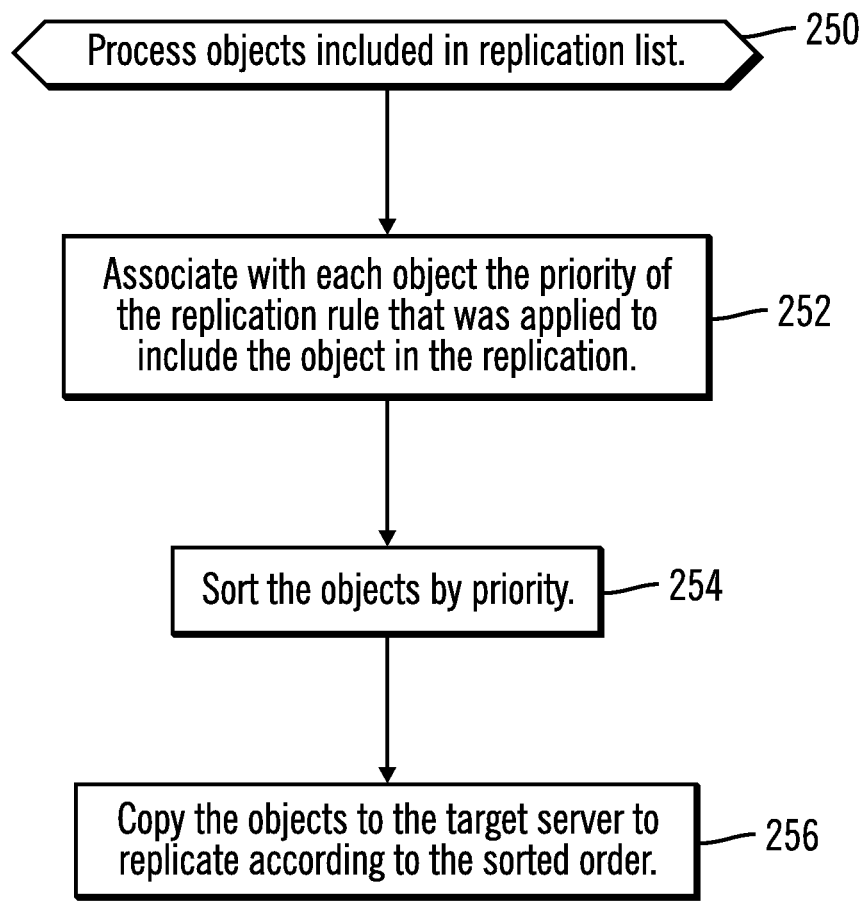
FIG. 8 illustrates an embodiment to prioritize copying of objects to replicate to the target server.

FIG. 8 illustrates an embodiment of operations performed by the source replication manager 6a to copy objects indicated in the replication list 20 to the target server 4b. To replicate, the source replication manager 6a processes (at block 250) the objects on the replication list 20. Each object on the list is associated at block 252) with the priority 94, 114 indicated in the replication rule that was applied to include the object in the replication list 20. The objects in the list 20 are then sorted (at block 254) by priority and, in certain embodiments, another attribute, and then the source replication manager 6a copies (at block 256) the objects to the target server 4b according to the sort order, which is based on the priority and maybe another factor.

With the described embodiments, a user may define a hierarchy of replication rules that are applied to objects to determine whether to replicate the objects based on one or more attributes defined in the replication rule and the corresponding one or more attribute values of the object. Further, priorities may be provided for the replication rules to associate that priority with objects that satisfy the replication rule to control the priority at which objects are copied to the target server as part of replication. Further, with described embodiments, replication rules may be organized according to a hierarchy defined to have different levels of replication rules, where replication rules at a lower, more specific, level are applied before those at a higher, more general, level, and higher level rules are considered if the object did not satisfy the condition with respect to lower level replication rules.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 9-11. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
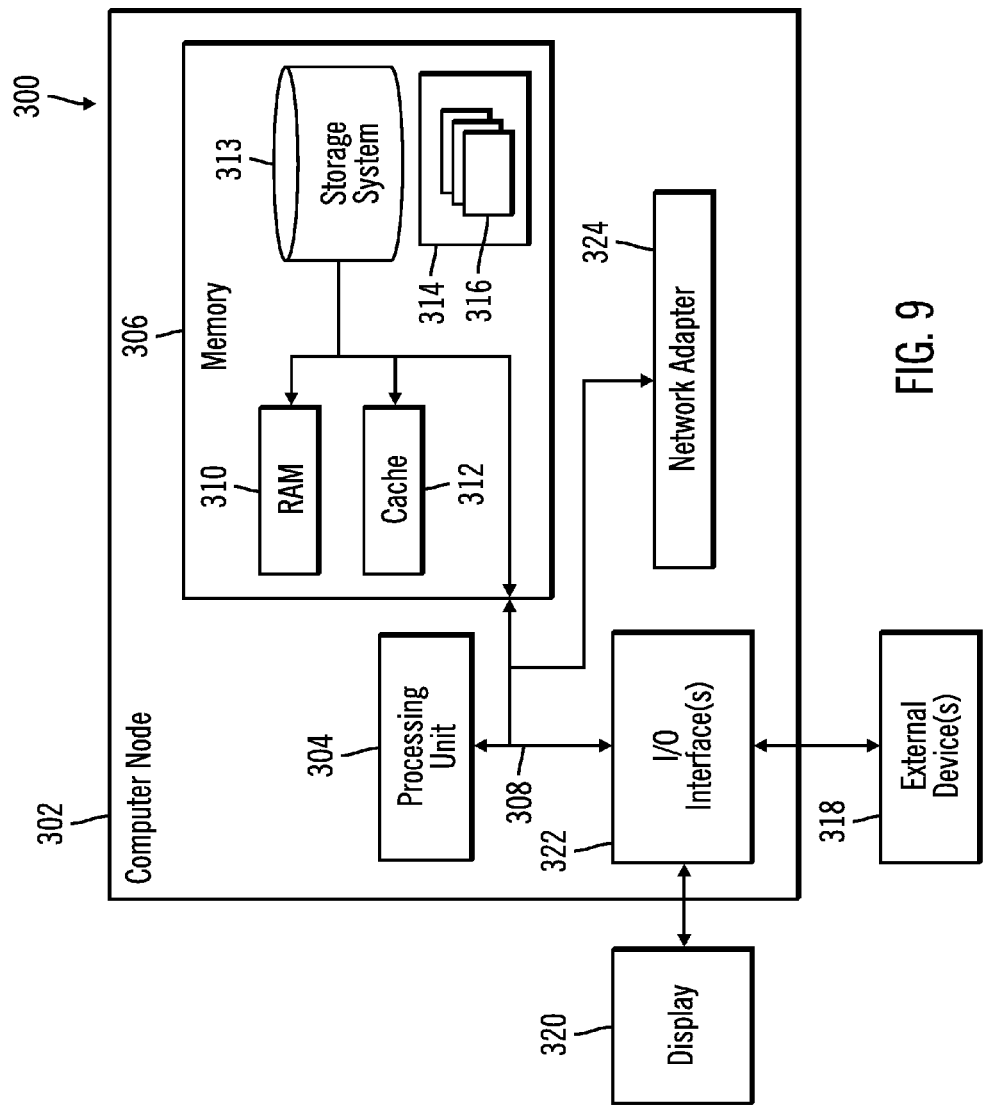
FIG. 9 illustrates an implementation of a node in the network computing embodiment.

FIG. 9 illustrates an embodiment of a cloud computing node 300 which may comprise an implementation of the source server 4a, target server 4b, and deduplication 24 components, where the components may be implemented in one or more of the nodes 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 10:
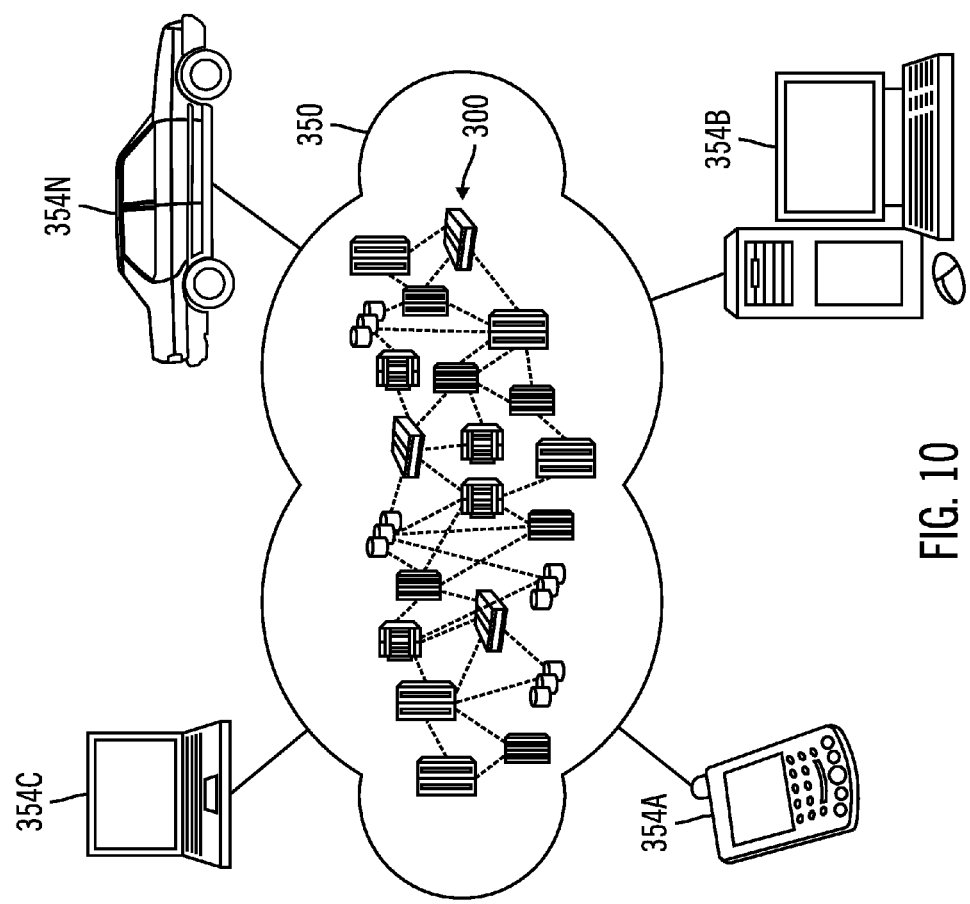
FIG. 10 illustrates an embodiment of a cloud computing environment.

Referring now to FIG. 10, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 10 are intended to be illustrative only and that computing nodes 300 and cloud computing environment 350 can communicate with any type of computerized device over any type of network and/or network addressable connection (e.g., using a web browser).

Further, FIG. 10 shows a single cloud. However, certain cloud embodiments may provide a deployment model including a separate "Backup" or "Data Protection" cloud, in addition to the cloud having the customer/production data. Providing a separate and distinct additional cloud as the data protection cloud in order to separate whatever primary cloud model (provide, community, hybrid, etc) from the data protection cloud prevents a single point of failure and provides a greater degree of protection of the customer data in the separate backup cloud.

Figure 11:
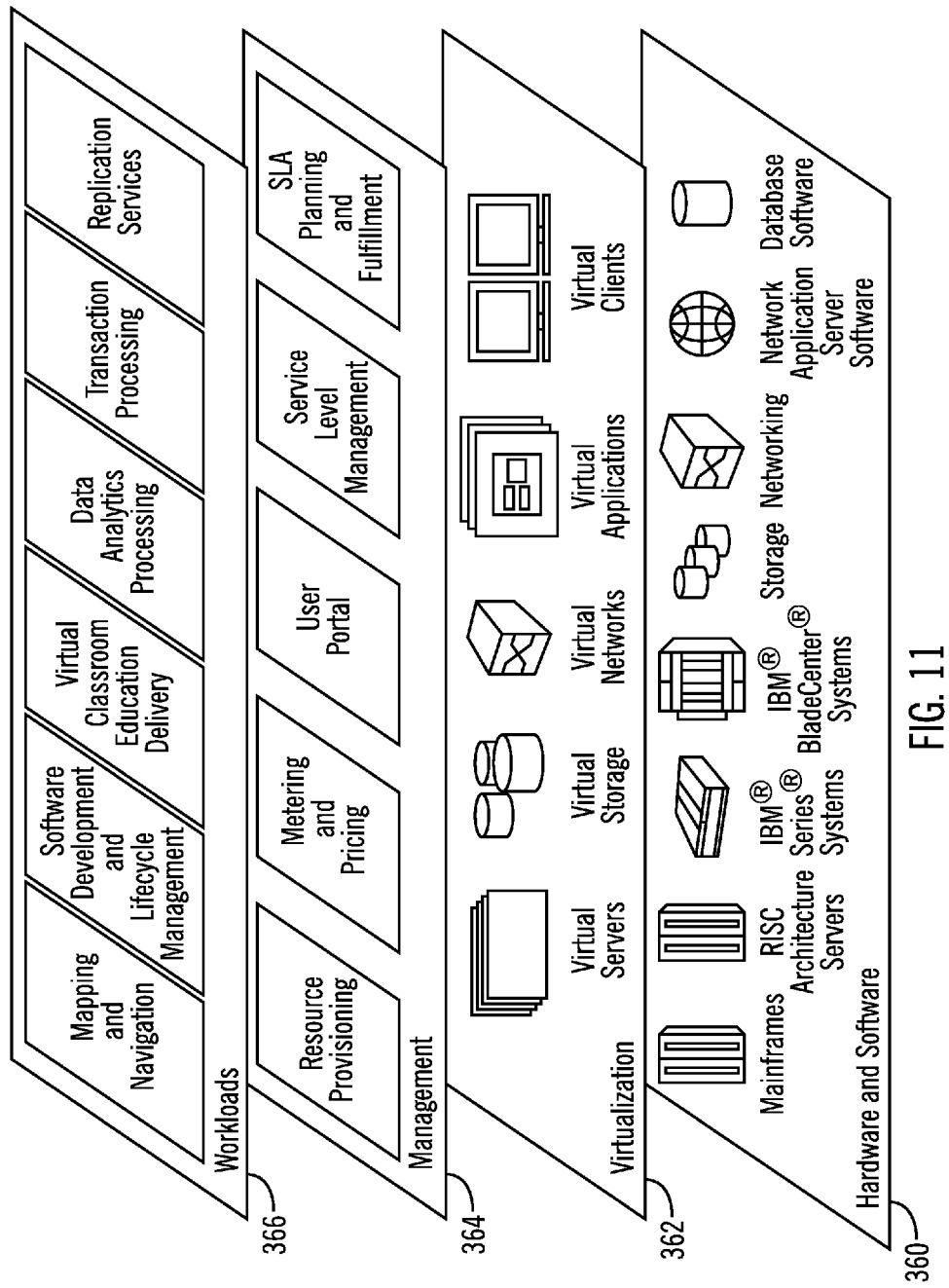
FIG. 11 illustrates an embodiment of abstraction model layers of a cloud computing environment.

Referring now to FIG. 11, a set of functional abstraction layers provided by cloud computing environment 350 (FIG. 12) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries®systems; RISC (Reduced Instruction Set Computer)

architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual sources.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the replication services, such as described with respect to FIGS. 1-8, above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7 and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for replicating objects from a source storage managed by a source server to a target storage managed by a target server, the computer program product comprising a non-transitory computer readable storage medium having computer readable program code embodied therein that executes to cause the source server to perform operations, the operations comprising:

maintaining, at the source server, a hierarchical arrangement of at least first and second level replication rules, wherein each of the first and second level replication rules in the hierarchy specifies a condition for a replication attribute and a replication action to take if the condition with respect to the replication attribute is satisfied, wherein the replication action in the first and second level replication rules of the hierarchy indicates to include or exclude each of the objects having an attribute value for the replication attribute that satisfies the condition;

initiating an operation to replicate objects at the source server to the target server;

for each of the objects, applying the first and second level replication rules in an order determined by the hierarchy until an attribute value of the object satisfies a condition of a replication attribute defined in the replication rule being applied according to the order by performing:

determining an attribute value of the object corresponding to the replication attribute in the replication rule;

determining whether the determined attribute value satisfies the condition for the replication attribute defined in the determined replication rule;

performing the replication action on the object in response to determining that the determined attribute value satisfies the condition for the replication attribute; and adding an identifier of the object to a replication list satisfying the condition in response to the replication action indicating to replicate the object; and copying the objects indicated in the replication list to the target server.

2. The computer program product of claim 1, wherein the replication rule indicates one of a plurality of replication attribute values for the replication attribute, wherein there are multiple replication rules for a plurality of the replication attribute values, wherein the condition of one of the replication rules is satisfied if the determined attribute value of the object satisfies the condition with respect to the replication attribute value of the replication rule.

3. The computer program product of claim 2, wherein the replication attribute value comprises at least one replication attribute value comprising at least one of an identifier of a client node associated with the object, a data type of the object, and a filespace in which the object is stored, wherein the object satisfies the condition of the replication rule in response to determining that the at least one determined attribute value of the object satisfies the condition with respect to the at least one replication attribute value.

4. The computer program product of claim 2, wherein the replication rules for the replication attribute values indicate one of a plurality of priorities, wherein the replication action indicates to include the object in replication, and wherein the operations further comprise:

copying the objects that are determined to be replicated to the target server according to the priorities indicated in the replication rules applied to the objects to determine to replicate the objects.

5. The computer program product of claim 2, wherein there is a global replication rule indicating a replication action regardless of replication attribute values, wherein the operations further comprise:

performing the replication action of the global replication rule in response to determining that the attribute value of the object does not match the replication attribute value of one of the replication rules specifying a replication attribute value and condition.

6. The computer program product of claim 5, wherein the global replication rule applies to objects added to the source storage, wherein the global replication rule applies to an object unless input is received from an administrator configuring a replication rule for attributes of the object.

7. The computer program product of claim 1, wherein the replication attribute value for each of the first level replication rules comprises a first level replication attribute value, wherein the attribute value of the object for the first level replication rules comprises a first level attribute value, wherein the operations further comprise:

maintaining, at the source server, for each of the second level replication rules a second level replication attribute, wherein the second level replication attribute has one of a plurality of second level replication attribute values, wherein there is one second level replication rule for each of a plurality of the second level replication attribute values, wherein the condition of one of the second level replication rules is satisfied if the determined second level attribute value of the object satisfies the condition with respect to the second level replication attribute value of the second level replication rule; and applying the first level replication rules in response to determining that a second level attribute value of the object does not satisfy the condition for the second level replication attribute value for one of the second level replication rules.

8. The computer program product of claim 1, wherein maintaining the first and second level replication rules comprises:

maintaining for each of the at least one first level replication rule a first level replication attribute value comprising an identifier of one of a plurality of client nodes associated with the object, wherein the object satisfies the condition of the first level replication rule in response to determining that the client node associated with the object matches the client node specified by the first level replication attribute value;

maintaining for each of the at least one second level replication rule second level replication attribute values comprising an identifier of one of a plurality of client nodes associated with the object and one of a plurality of data types of an object, wherein the object satisfies the condition of the second level replication rule in response to determining that the client node and data type of the object matches the client node and data type specified by the second level replication attribute value;

maintaining a third level replication rule having replication attribute values comprising an identifier of one of a plurality of client nodes associated with the object, one of a plurality of data types of an object, and one of a plurality of filespaces, wherein the object satisfies the condition of the third level replication rule in response to determining that the client node, data type, and filespace of the object matches the client node, data type, and filespace specified by the third level replication attribute value;

applying the first level replication rules in response to determining that the object does not satisfy the conditions of the second and third level replication rules; and applying the second level replication rules in response to determining that the object does not satisfy the conditions of the third level replication rules.

9. The computer program product of claim 1, wherein a hierarchy of replication rules are maintained, wherein each of the replication rules in the hierarchy specifies a condition for a replication attribute and replication action, wherein the applying of the replication rules comprises applying at least one of the replication rules in an order determined by the hierarchy.

10. A system for replicating objects from a source storage to a target storage managed by a target server, comprising:

a processor;
a computer readable storage medium including:
a hierarchical arrangement of at least first and second level replication rules, wherein each of the first and second level replication rules in the hierarchy specifies a condition for a replication attribute and a replication action to take if the condition with respect to the replication attribute is satisfied, wherein the replication action in the first and second level replication rules of the hierarchy indicates to include or exclude each of the objects having an attribute value for the replication attribute that satisfies the condition;

code, executed by the processor, to perform operations, the operations comprising:

initiating an operation to replicate objects to the target server;
for each of the objects, applying the first and second level replication rules in an order determined by the hierarchy until an attribute value of the object satisfies a condition of a replication attribute defined in the replication rule being applied according to the order by performing:

determining an attribute value of the object corresponding to the replication attribute in the replication rule;
determining whether the determined attribute value satisfies the condition for the replication attribute defined in the determined replication rule;
performing the replication action on the object in response to determining that the determined attribute value satisfies the condition for the replication attribute; and
adding an identifier of the object to a replication list satisfying the condition in response to the replication action indicating to replicate the object; and
copying the objects indicated in the replication list to the target server.

11. The system of claim 10, wherein the replication rule indicates one of a plurality of replication attribute values for the replication attribute, wherein there are multiple replication rules for a plurality of the replication attribute values, wherein the condition of one of the replication rules is satisfied if the determined attribute value of the object satisfies the condition with respect to the replication attribute value of the replication rule.

12. The system of claim 11, wherein the replication rules for the replication attribute values indicate one of a plurality of priorities, wherein the replication action indicates to include the object in replication, and wherein the operations further comprise:

copying the objects that are determined to be replicated to the target server according to the priorities indicated in the replication rules applied to the objects to determine to replicate the objects.

13. The system of claim 11, wherein there is a global replication rule indicating a replication action regardless of replication attribute values, wherein the operations further comprise:

performing the replication action of the global replication rule in response to determining that the attribute value of the object does not match the replication attribute value of one of the replication rules specifying a replication attribute value and condition.

14. The system of claim 13, wherein the global replication rule applies to objects added to the source storage, wherein the global replication rule applies to an object unless input is received from an administrator configuring a replication rule for attributes of the object.

15. The system of claim 10, wherein the replication attribute value for each of the first level replication rules comprises a first level replication attribute value, wherein the attribute value of the object for the first level replication rules comprises a first level attribute value, wherein the operations further comprise:

maintaining for each of the second level replication rules a second level replication attribute, wherein the second level replication attribute has one of a plurality of second level replication attribute values, wherein there is one second level replication rule for each of a plurality of the second level replication attribute values, wherein the condition of one of the second level replication rules is satisfied if the determined second level attribute value of the object satisfies the condition with respect to the second level replication attribute value of the second level replication rule; and applying the first level replication rules in response to determining that a second level attribute value of the object does not satisfy the condition for the second level replication attribute value for one of the second level replication rules.

16. The system of claim 10, wherein maintaining the first and second level replication rules comprises:

maintaining for each of the at least one first level replication rule a first level replication attribute value comprising an identifier of one of a plurality of client nodes associated with the object, wherein the object satisfies the condition of the first level replication rule in response to determining that the client node associated with the object matches the client node specified by the first level replication attribute value;

maintaining for each of the at least one second level replication rule second level replication attribute values comprising an identifier of one of a plurality of client nodes associated with the object and one of a plurality of data types of an object, wherein the object satisfies the condition of the second level replication rule in response to determining that the client node and data type of the object matches the client node and data type specified by the second level replication attribute value;

maintaining a third level replication rule having replication attribute values comprising an identifier of one of a plurality of client nodes associated with the object, one of a plurality of data types of an object, and one of a plurality of filespaces, wherein the object satisfies the condition of the third level replication rule in response to determining that the client node, data type, and filespace of the object matches the client node, data type, and filespace specified by the third level replication attribute value;

applying the first level replication rules in response to determining that the object does not satisfy the conditions of the second and third level replication rules; and applying the second level replication rules in response to determining that the object does not satisfy the conditions of the third level replication rules.

17. The system of claim 10, wherein a hierarchy of replication rules are maintained, wherein each of the replication rules in the hierarchy specifies a condition for a replication attribute and replication action, wherein the applying of the replication rules comprises applying at least one of the replication rules in an order determined by the hierarchy.

18. A method, comprising:

maintaining, at a source server, a hierarchical arrangement of at least first and second level replication rules, wherein each of the first and second level replication rules in the hierarchy specifies a condition for a replication attribute and a replication action to take if the condition with respect to the replication attribute is satisfied, wherein the replication action in the first and second level replication rules of the hierarchy indicates to include or exclude each of a plurality of objects having an attribute value for the replication attribute that satisfies the condition;

initiating an operation to replicate objects at the source server to a target server;

for each of the objects, applying the first and second level replication rules in an order determined by the hierarchy until an attribute value of the object satisfies a condition of a replication attribute defined in the replication rule being applied according to the order by performing:

determining an attribute value of the object corresponding to the replication attribute in the replication rule;

determining whether the determined attribute value satisfies the condition for the replication attribute defined in the determined replication rule;

performing the replication action on the object in response to determining that the determined attribute value satisfies the condition for the replication attribute; and adding an identifier of the object to a replication list satisfying the condition in response to the replication action indicating to replicate the object; and copying the objects indicated in the replication list to the target server.

19. The method of claim 18, wherein the replication rule indicates one of a plurality of replication attribute values for the replication attribute, wherein there are multiple replication rules for a plurality of the replication attribute values, wherein the condition of one of the replication rules is satisfied if the determined attribute value of the object satisfies the condition with respect to the replication attribute value of the replication rule.

20. The method of claim 19, wherein the replication rules for the replication attribute values indicate one of a plurality of priorities, wherein the replication action indicates to include the object in replication, and wherein the operations further comprise:

copying the objects that are determined to be replicated to the target server according to the priorities indicated in the replication rules applied to the objects to determine to replicate the objects.

21. The method of claim 19, wherein there is a global replication rule indicating a replication action regardless of replication attribute values, wherein the operations further comprise:

performing the replication action of the global replication rule in response to determining that the attribute value of the object does not match the replication attribute value of one of the replication rules specifying a replication attribute value and condition.

22. The method of claim 21, wherein the global replication rule applies to objects added to a source storage managed by the source server, wherein the global replication rule applies to an object unless input is received from an administrator configuring a replication rule for attributes of the object.

23. The method of claim 18, wherein the replication attribute value for each of the first level replication rules comprises a first level replication attribute value, wherein the attribute value of the object for the first level replication rules comprises a first level attribute value, wherein the operations further comprise:

maintaining, at the source server, for each of the second level replication rules a second level replication attribute, wherein the second level replication attribute has one of a plurality of second level replication attribute values, wherein there is one second level replication rule for each of a plurality of the second level replication attribute values, wherein the condition of one of the second level replication rules is satisfied if the determined second level attribute value of the object satisfies the condition with respect to the second level replication attribute value of the second level replication rule; and applying the first level replication rules in response to determining that a second level attribute value of the object does not satisfy the condition for the second level replication attribute value for one of the second level replication rules.

24. The method of claim 18, wherein maintaining the replication rule comprises:

maintaining for each of the at least one first level replication rule a first level replication attribute value comprising an identifier of one of a plurality of client nodes associated with the object, wherein the object satisfies the condition of the first level replication rule in response to determining that the client node associated with the object matches the client node specified by the first level replication attribute value;

maintaining for each of the at least one second level replication rule second level replication attribute values comprising an identifier of one of a plurality of client nodes associated with the object and one of a plurality of data types of an object, wherein the object satisfies the condition of the second level replication rule in response to determining that the client node and data type of the object matches the client node and data type specified by the second level replication attribute value;

maintaining a third level replication rule having replication attribute values comprising an identifier of one of a plurality of client nodes associated with the object, one of a plurality of data types of an object, and one of a plurality of filespaces, wherein the object satisfies the condition of the third level replication rule in response to determining that the client node, data type, and filespace of the object matches the client node, data type, and filespace specified by the third level replication attribute value;

applying the first level replication rules in response to determining that the object does not satisfy the conditions of the second and third level replication rules; and applying the second level replication rules in response to determining that the object does not satisfy the conditions of the third level replication rules.

25. The method of claim 18, wherein a hierarchy of replication rules are maintained, wherein each of the replication rules in the hierarchy specifies a condition for a replication attribute and replication action, wherein the applying of the replication rules comprises applying at least one of the replication rules in an order determined by the hierarchy.

* * * * *